Feb. 11, 1941.　　　J. M. GOLDBERG　　　2,231,383
FILM SPLICER AND REWINDER
Filed Sept. 12, 1938　　4 Sheets-Sheet 4
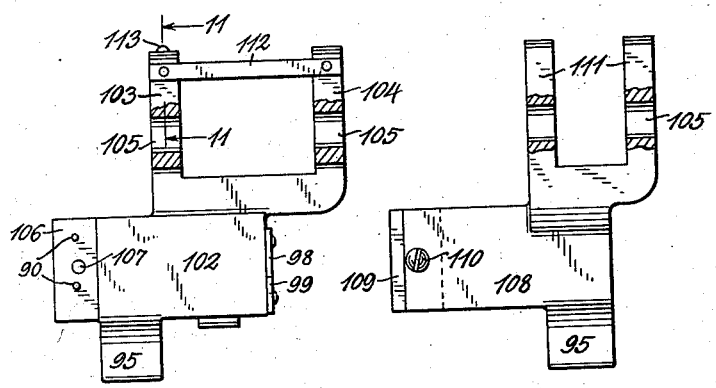
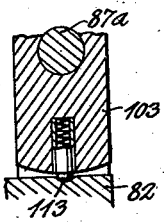
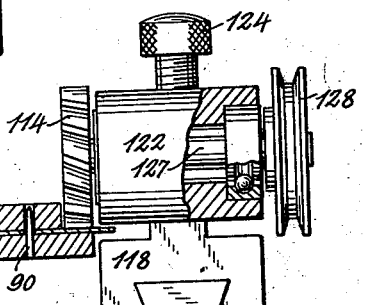
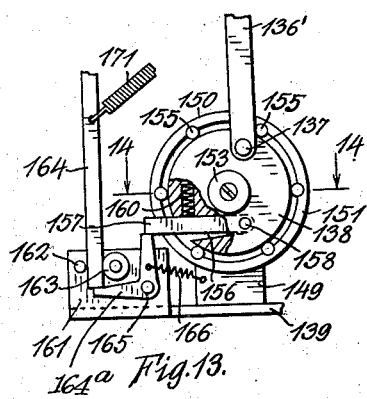
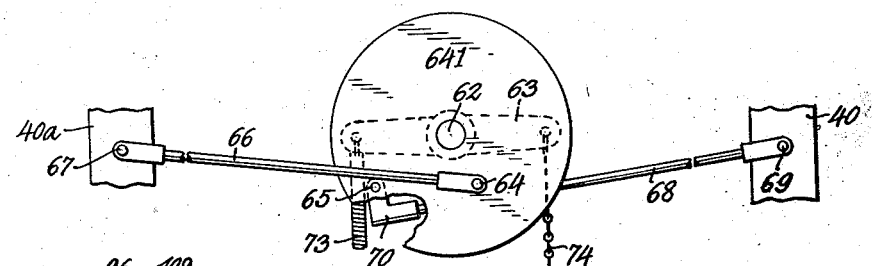
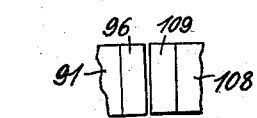
INVENTOR.
Jacob M. Goldberg.
BY
ATTORNEY.

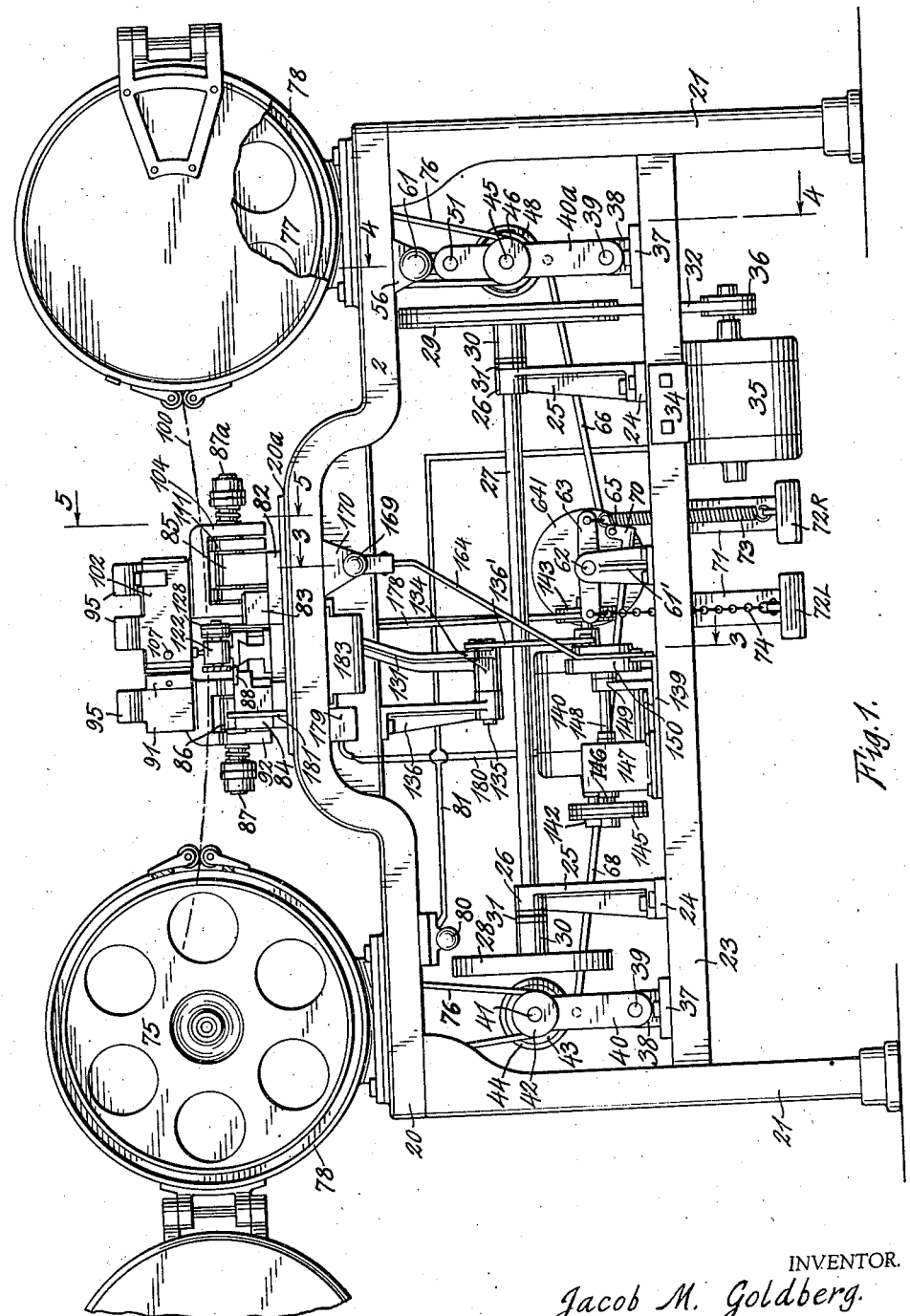

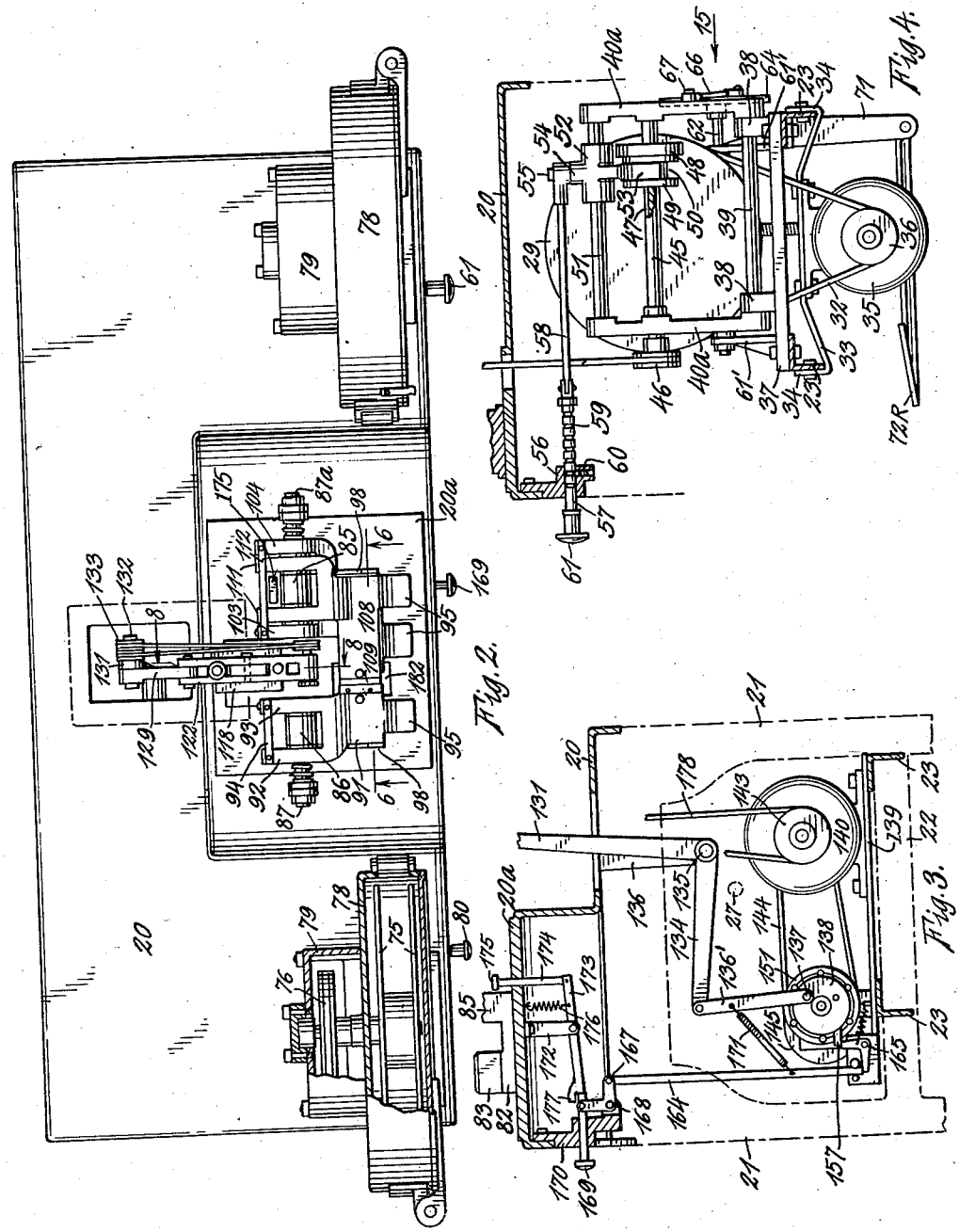

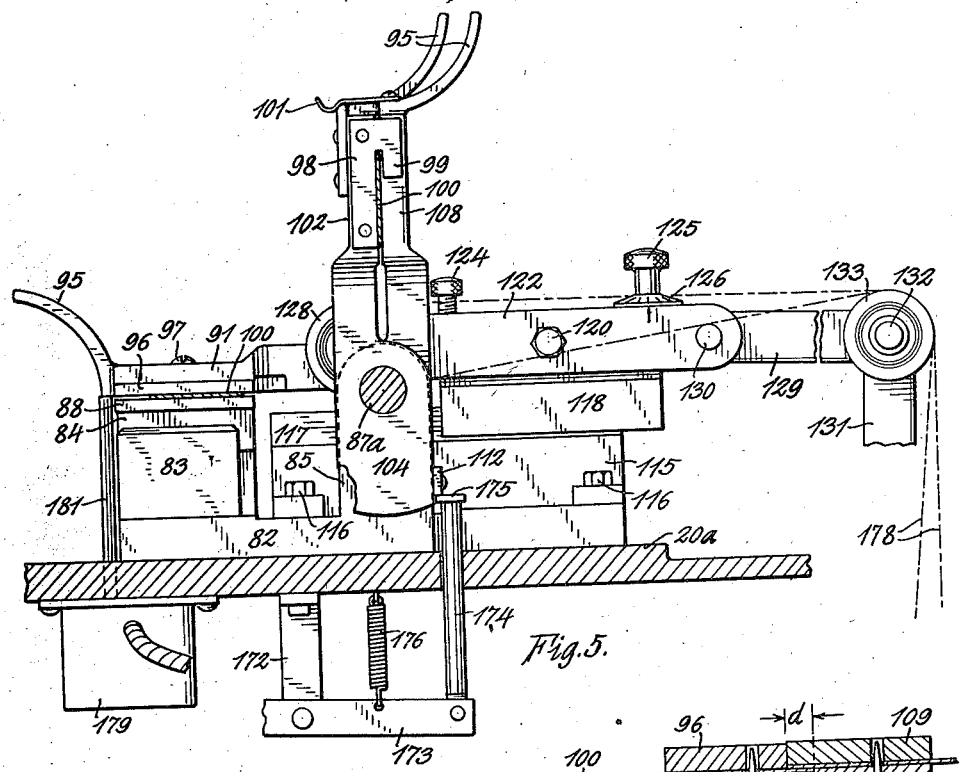

Patented Feb. 11, 1941

2,231,383

UNITED STATES PATENT OFFICE 2,231,383

FILM SPLICER AND REWINDER

Jacob M. Goldberg, Denver, Colo.

Application September 12, 1938, Serial No. 229,499

13 Claims. (Cl. 154—42)

This invention relates to improvements in machines for rewinding motion picture films upon reels and for mending or splicing broken or torn films.

The principal object of this invention is to provide a film splicing device that can be positioned between a supply and a rewind reel and which can be conveniently operated for the purpose of mending a broken film.

Another object of this invention is to provide a splicing device of a semi-automatic character in which the mechanism performs all of the steps that require accuracy and skill and for the operation of which no particular skill or training is required.

A further object is to produce a film splicing device having a rotary cutter or cleaner for removing the emulsion, which is mechanically operated and which has a safely mechanism that prevents the cleaner from being operated except when the cooperating parts are in proper position.

A still further object is to produce a splicing device that can be operated quickly and which will positively hold the film, cut the ends the proper length, remove the emulsion, prepare the surface for the reception of the cement, position the ends of the film in proper overlapping position and apply the proper pressure to the ends to effect a proper adhesion.

A still further object is to produce a film winding mechanism, operated by a separate motor, and controlled by pedals, for winding the film from one reel to another, the machine being so constructed that either one of the two reels can be used as the winding reel by the operation of pedals.

Another object is to provide a machine for the purpose indicated, which shall be so constructed that the fire hazards shall be reduced to a minimum.

The above and any other objects that may appear as the description proceeds are attained by means of a construction and an arrangement of parts that will now be described in detail, and for this purpose reference will be had to the accompanying drawings in which the invention has been illustrated in its preferred form and in which Figure 1 is a front elevation of the combined winding and film splicing device, showing one reel housing open and the removable parts of the film splicing device in inoperative position;

Figure 2 is a top plan view showing one reel housing partly in section and the movable portions of the splicing device in operative position;

Figure 3 is a section taken on line 3—3, Fig. 1;
Figure 4 is a section taken on line 4—4, Fig. 1;
Figure 5 is a section taken on line 5—5, Fig. 1;
Figure 6 is a section taken on line 6—6, Fig. 2, and shows the film clamping jaws in the position they occupy just previous to the trimming of the ends of the film;

Figure 7 is a fragmentary section, like that shown in Fig. 6, showing the position of the parts after the film has been cut and while the cement is setting.

Figure 8 is a section taken on line 8—8, Fig. 2, and shows the position of the parts immediately before and immediately after the cleaner functions to remove the emulsion from the film;

Figure 9 shows a top plan view, partly in section, of the lower film clamping jaw of the pair shown in vertical position in Fig. 5;

Figure 10 is a top plan view, partly in section, of the upper film clamping jaw of the pair of which Fig. 9 shows the lower jaw;

Figure 11 is a section, to a somewhat enlarged scale, taken on line 11—11, Fig. 9, and shows the spring detent for holding the jaw in vertical position;

Figure 12 is a section taken on line 12—12, Fig. 8, a portion of the bearing being shown in section;

Figure 13 is a fragmentary view, similar to that shown in Fig. 3, and shows the clutch to a somewhat enlarged scale, with portions broken away to better disclose the construction;

Figure 14 is a section taken on line 14—14 Fig. 13;

Figure 15 is a fragmentary rear elevation, looking in the direction of arrow 15 in Fig. 4 and shows the mechanism employed for operating the clutches that control the rotation of the reels for winding the film; and Figure 16 is a diagrammatic view, illustrating the manner in which the movable film cutting jaws move during operation.

The machine illustrated comprising two parts each of which can be operated independently of the other and which have been brought into juxtaposition for the sake of convenience. One part comprises a mechanism for inspecting and rewinding the film. It is well known that after a film has been exhibited it must be wound onto another reel before it can be further exhibited and during this operation it is examined for breaks. If breaks or tears are found it is evident that the film must be repaired by cutting out the injured portion and joining the ends. For the purpose of repairing breaks a film splicing device has been positioned between the two reels so that if the film has been torn or broken the reels can be stopped and the film quickly repaired.

The machine illustrated comprises a table 20 that is supported on four legs 21, one at each corner. The two legs at each end are connected by means of a bar 22, which has been indicated by dot and dash lines in Fig. 3. The two end bars 22, are connected by means of longitudinal parallel angle iron bars 23, which serve to support several elements of the machine, to which attention will be called.

From Fig. 1 it will be seen that bars 23 are connected by transverse bars 24 to which are attached vertical supports 25 that terminate in bearings 26 in which is journalled a shaft 27. Attached to the end of the shaft are friction disks 28 and 29, each of which has a hub 30. A ball bearing 31 is positioned between each hub and the adjacent bearing. It will be observed that disk 29 is of greater diameter than disk 28 and has a grooved periphery for the reception of a V-shaped belt 32.

A bracket 33 having upturned ends 34, is attached to the vertical sides of the angle irons 23 and this serves as a support for a motor 35 which has a grooved pulley 36 that cooperates with belt 32 for the purpose of turning shaft 27. Secured to bars 23, between their ends and the disks 28 and 29, are bars 37 having spaced perforated lugs 38. The openings in lugs 38 serve as bearings for shafts 39. Attached to the ends of the shaft 39, at the left in Fig. 1, are two brackets 40, whose upper ends have bearings in which is journaled a shaft 41. Attached to the front end of shaft 41 is a grooved pulley 42 and splined to the shaft, between the brackets 40, is a friction pinion 43 that is provided with a leather tire 44.

Extending upwardly from the ends of shaft 39, to the right in Fig 1, are brackets 40a that are somewhat longer than the corresponding brackets 40, and have bearings for a shaft 45 having one end provided with a grooved pulley 46. Shaft 45 has a longitudinal groove 47 and carries a friction pinion 48 having a hub 49 provided with a groove 50. A round bar 51 connects the upper ends of brackets 40a and slidably mounted on this bar is a tubular member 52 having a downwardly extending fork whose two fingers 53 project into the groove 50. The upper surface of member 52 has a hub 54 from the upper end of which a pin 55 projects. Member 52 with its fingers 53 constitutes a shifting fork for adjusting the position of the friction pinion along shaft 45. A bracket 56 is attached to the front flange of the table 20 and has an opening for the push rod 57. The inner end of this rod is connected to pin 55 by means of a connecting rod 58. The push rod is provided with spaced circumferential grooves 59 and bracket 56 has a spring pressed detent 60 for engaging the grooves 59. The outer end of the push rod has a knob 61 for convenience in operating it. It will be apparent that by means of rods 57 and 58 the distance from the center of disk 29 to the friction pinion can be adjusted. It will be seen from Fig. 1 that the friction pinions are both out of contact with their cooperating friction disks and means must therefore be provided for moving them into and out of engagements, and this means will now be described. From Figs. 1 and 4 it will be seen that an upwardly extending bracket 61' is attached to each bar 23 and journaled in bearings in the upper ends of these brackets is a shaft 62, which is held from longitudinal movement by suitable means. A cross bar 63 is splined to the shaft and extends to both sides thereof as shown in Figs. 1 and 15. A disk 641 is splined to the rear end of shaft 62 and this is provided with pivot pins 64 and 65, the former projecting from the rear side and the latter from the front side (Fig. 15). A connecting rod 66 extends from pin 64 to a pin 67 on bracket 40a and a corresponding rod 68 extends from pin 65 to a pin 69 on bracket 40. Attention is called to the fact that rod 68 has a bend 70 where it connects with pin 65 so that the disk 641 can be turned clockwise, Fig. 15, until pin 65 passes dead center; this serves to latch the parts with friction pinion 43 in operative engagement with disk 28.

Attached to the bar 23, at the rear of the machine, are two downwardly extending brackets 71 to the lower ends of which are pivotally connected pedals 72R and 72L. Pedal 72R is connected with the right end of rocker bar 63 by means of a tightly wound coil spring 73 and pedal 72L is connected with the other end of bar 63 by means of a chain 74. Referring now more particularly to Fig. 1, it will be observed that when pressure is exerted on pedal 72L, disk 641 will be rotated counter clockwise and this will move the connecting rod 68 towards the right until the tire 44 engages disk 28 and when pin 65 passes the dead center position the parts will remain latched. If this occurs while shaft 27 rotates, it is evident that pulley 42 will also be rotated and this in turn will rotate reel 75 through the medium of belt 76.

If pedal 72R is pressed down, disk 641 will be rotated clockwise and move the friction pinion 48 against the outer surface of disk 29 whereby pulley 46 will be rotated and will drive the reel 77 in housing 78. During the rewinding operation reel 75 is the supply reel and reel 77 the rewind reel. When pedal 72L is pressed down hard the parts will latch and reel 75 will continue to rotate after the pressure has been removed from the pedal. When pedal 72R is pressed down it tensions spring 73 and this exerts a yielding torque tending to rotate disk 641 clockwise. By exerting a counter pressure on pedal 72L pinion 48 can be moved gently into engagement with the surface of disk 29 and in this way the film can be moved towards the right short distances. When the parts are in the position shown in Fig. 1 the two reels are stationary and by proper manipulation of the pedals the film can be moved in either direction. By using a resilient connection from one pedal and an inextensible connection from the other, the friction gears can be controlled with great nicety. It will be observed that the housings 78 are provided with rear housing 79 that enclose the pulleys and belts so as to guard against accidental injury to the operator and also guard against fire from electric sparks which sometimes occur in dry climates.

In Fig. 1 reference numeral 80 designates the main control switch which may be of any suitable make but should be double pole. A circuit 81 extends to motor 35 so that whenever switch 80 is closed, motor 35 will run and rotate shaft 27. The speed of reel 77 can be controlled by the push rod 61 in a manner quite clear from Fig. 4.

The above description has been restricted to the rewind mechanism and the film splicing device will now be described.

During use, films often become torn along the edges and sometimes these tears extend entirely across the film. Regardless how small the tear is, it is necessary to cut out the injured section and splice the film. Such splices must be carefully made and several different mechanisms have been invented for this purpose.

From Figs. 1, 2 and 3 it will be seen that the table is provided with a raised area 20a on which is supported the splicing device whose construction and operation will now be described.

Attached to the top of the raised portion 20a is a block 82 which forms the base of the splicing device. The base is provided with upwardly extending, integral projections 83 and 84 positioned near its front edge and with two lugs 85 and 86 that are perforated for the reception of pivot bolts 87. The top of projection 84 is flat and has attached thereto, along its inner edge, a steel shear plate 88 that is held in place by screws 89. The shear plate carries two upwardly extending pins 90 positioned to pass through sprocket openings in a film. A clamping jaw 91 has two spaced, rearwardly extending arms or fingers 92 and 93 that straddle the lug 86. A pivot bolt 87 extends through an opening (Fig. 16) in lug 86 and is held in place by a pin or other means, not shown, so that it will neither rotate or move lengthwise. The outer end of bolt 87 is threaded and provided with a nut. A ball thrust bearing is positioned inside of the nut and this is separated from arm 92 by a compression spring which exerts a force that urges arm 92 against the outer surface of lug 86 so as to produce sufficient friction to hold the jaw in any position. Arms 92 and 93 extend some distance to the rear of lug 86 and are connected by a strap 94 that serves as a stop for limiting the rearward rotation of the jaw. Extending forwardly from jaw 91 is a handle 95 which has been shown curved but which may be straight or any other shape. Attached to the under side of jaw 91 is a steel shear plate 96 that is held in place by one or more screws 97. The inner or cutting edge of shear plate 96 is spaced a distance $d$ which is approximately five thirty-seconds of an inch from the corresponding edge of plate 88, (Fig. 7). Shear plate 96 has holes for the reception of the positioning pins 90. Attached to the outer end surface of lug 84 is a plate 98 whose shape can be seen in Figs. 5 and 6, the short side being indicated by reference numeral 99. When the film 100 is to be positioned for cutting and splicing its edge is first inserted in the notch between arms 98 and 99 and then adjusted so that the two pins 90 will enter holes in the film after which jaw 91 is moved down into clamping position. A spring analogous to the one shown in Fig. 5 and designated by number 101, can be attached to lug 84 for the purpose of holding jaw 91 in clamping position, as shown in Fig. 6.

The other end of the film is clamped between a pair of movable jaws that will now be described. The lower jaw of the pair has been designated by numeral 102 and is provided with spaced arms 103 and 104 that have openings 105 for the reception of the pivot pin 87a. A steel shear plate 106 is attached to the upper surface of jaw 102 by a screw 107. Plate 98 is attached to the outer edge of jaw 102 in the manner shown in Fig. 5. The other jaw of the cooperating pair has been shown in plan view in Fig. 10 and has a jaw portion 108 of substantially the same area as jaw 102 and is provided on its under surface, near its inner end with a steel shear plate 109 held in place by a screw 110. Shear plate 109 projects over shear plate 106 a distance $d$ in the manner shown in Fig. 7. Referring now to Fig. 10, it will be observed that jaw 108 has two rearwardly extending fingers 111 spaced to straddle lug 85. The distance between the outer surfaces of fingers 111 is equal to the distance between the corresponding fingers 103 and 104, and when the parts are assembled the fingers are in the position shown in Fig. 2. A strap 112 extends between and is secured to arms 103 and 104, as shown in Fig. 9. Pivot pin 87a is secured in an opening in lug 85 and serves to hold the jaws in operative relation.

Attention is called at this point to Fig. 16 from which it will be seen that the axes of the openings in lugs 85 and 86 incline upwardly and inwardly with respect to a horizontal plane but both lie in the same vertical plane. The result of this is that jaws 91 and 102 move apart as they move from the position shown in Fig. 2 to that shown in Fig. 1 and this makes it possible to pass the jaws without cutting the film clamped between jaws 102 and 108.

Arm 103 of jaw 102 has a spring pressed detent 113 which cooperates with a depression in base 82, as shown in Fig. 11, for the purpose of holding jaws 102 and 108 in the position shown in Figs. 1 and 5.

For the purpose of removing the emulsion and cleaning the surface of the film a rotating cleaner 114 has been provided and the construction and operation of the film cleaning mechanism will now be described. Referring now more particularly to Figs. 5, 8 and 12, it will be seen that a guide block 115 is attached to base 82 by means of cap screws 116. The upper edge of the guide block has upwardly and outwardly inclined sides 117 which engage the corresponding sides of the dove-tail groove in slide 118. The slide is provided with an upwardly extending elongated lug 119 with parallel sides and this has a transverse hole for the reception of a pivot pin 120. The upper edge has notches 121 cut from its corners. A bifurcated lever having spaced arms 122 fits over the lug or projection 119 and is secured to the latter by the pivot pin 120, so as to be tiltable about this pin. The arms are connected by members 123 that are provided with threaded openings for the reception of bolts or screws 124 and 125 whose lower ends engage the bottom surfaces of the notches 121. By adjusting the two screws the lever can be tilted about the axis of pin 120. Screw 125 is provided with a flange 126 having radial graduations which are of assistance in making adjustments. The front end of the lever has a transverse opening in which is journaled a shaft 127. The cleaner comprises a milling cutter 114 that is attached to one end of this shaft and a grooved pulley 128 is attached to the other end (Fig. 12). A connecting rod 129 has one end positioned between arms 122 and is attached to the latter by a pivot pin 130. The rear end of the connecting rod is pivotally connected with the upper end of arm 131 by a pin 132 to one end of which is rotatably mounted two grooved pulleys 133. Arm 131 is the vertical arm of a bell crank lever whose horizontal arm has been designated by numeral 134. This lever is pivoted at 135 to the lower end of a downwardly extending bracket 136 (Fig. 3).

The free end of arm 134 is joined by a connecting rod 136' to a crank pin 137 on the rotatable disk 138 that forms part of a clutch mechanism that will now be described.

Referring now to Figs. 1, 3, 13 and 14. It will be seen that a plate 139 is supported on and attached to bars 23. A motor 140 is secured to the upper surface of this plate by screws. The drive shaft of the motor carries a grooved pulley 142 at the left end, Fig. 1, and a smaller pulley 143 at the right end. Pulley 142 is connected by means of a V belt 144 with a pulley 145 that is secured to the outer end of a shaft 146 of a gear reduction mechanism positioned in the housing 147. From the low speed side of the reduction side of the gear, a shaft 148 extends and is journaled in a bearing in the upper end of bracket 149. To the outer end of shaft 148 a clutch disk 150 is attached. This disk has a circular flange 151 on one side, extending around its outer periphery, and an elongated hub 152 that serves as a bearing for clutch member 138, the latter being held in place by a washer 153 secured to the end of shaft 148 by means of a screw 154. It will be observed that clutch disk 150 is provided with a plurality of angularly spaced steel pins 155. Clutch member 138 is provided with a recess 156 on its inner surface, which extends in the direction of a chord and in which is positioned a lever 157 whose inner end is connected with disk 138 by a pivot pin 158. The inner surface of lever 157 has a shoulder 159 that normally rests on the inner surface of flange 151 and is urged into such position by a coil spring 160. Plate 139 has an upwardly extending portion 161 on whose outer surface is a pin 162 and a roller 163, spaced to receive the lower edge of a bar 164. A bell crank 164a is pivoted at 165 and a spring 166 connects its vertical arm with the bracket 149 and normally holds the horizontal arm in engagement with the roller 163 or with the lower end of bar 164. When the parts are in the position shown in Fig. 13, the end of lever 157 rests on the upper end of the vertical arm of the bell crank. When motor 140 is operating, clutch disk 150 rotates counter clockwise and if the bell crank is rotated counterclockwise sufficiently to release lever 157, the latter will immediately be forced against the inside of flange 151 and the shoulder 159 will be engaged by one of the pins 155, thereby establishing a positive operative connection between the driving and the driven disk of the clutch. If the bell crank is released it will move into the position shown in Fig. 13, and when lever 157 strikes its upper end the clutch connection will be released and disk 138 will stop while disk 150 will continue to rotate. If bell crank lever is rotated sufficiently to release lever 157 and immediately returned to the position shown in Fig. 13, disk 138 will rotate one complete revolution and stop.

Having reference now more particularly to Figs. 3 and 5, it will be noted that the upper end of bar 164 is pivotally connected at 167 with the horizontal arm of a bell crank pivoted at 168. A plunger 169 is slidable in an opening in a bracket 170 that projects downwardly from the table flange. The inner end of this plunger is connected with the upper end of the vertical arm of the bell crank. It is evident that bar 164 will be moved downwardly whenever plunger 169 is pushed inwardly and this will release lever 157 and put the clutch into operation. Springs 166 and 171 will return the parts to normal position immediately pressure is removed from plunger 169. In Fig. 3 a safety latch has been shown which consists of a bracket 172 to the lower end of which a lever 173 is pivoted. A plunger 174 is pivoted to the rear end of lever 173 and passes through an opening in the table and terminates in a flat head 175 that is positioned between arms 111 as shown in Figure 2. A tension spring 176 extends between the under surface of the elevated portion 20a of the table and the lever and tends to maintain the parts in the position shown. An overhanging portion 177 on lever 173, or some other equivalent means limits the downward movement thereof. It is evident that when lever 173 is in the position shown in Fig. 3, plunger 169 cannot be moved inwardly and therefore the clutch cannot function until lever 173 has been moved out of latching position.

From Fig. 5 it will be seen that a belt 178 passes over pulley 128, thence over idler pulleys 133 and thence downwardly and around pulley 143 on motor 140. It is now evident that whenever motor 140 operates, the clutch disk 150 and the milling cutter 114 will both rotate. It is also apparent that if lever 173 is moved to unlatching position and plunger 169 pushed inwardly so as to release lever 157, and is then released, clutch disk 138 will make one complete rotation. The downward and upward movement of the connecting rod 136' will oscillate the bell crank arms 131 and 134 about the pivot 135 and, since the upper end of arm 131 is connected with slide 118 by the link 129, slide 118 and attached parts will reciprocate, moving first to the left and then return to the position shown. During the reciprocation of slide 118 the milling cutter or cleaner will pass over film 100 and return to the position shown in Fig. 8 where it will stop when the clutch is released. By means of the adjusting screws 124 and 125 the cleaner is adjusted so that it will remove the emulsion from the film and scrape the surface slightly so as to prepare the film for the reception of the cement.

It is evident that the jaws 91, 102 and 108 must be so positioned during the operative cycle of the cleaner that the latter will meet no obstruction. The jaw 91 must be in clamping position, as shown in Figs. 5 to 8 and in Fig. 12. Although no injury would occur to the machine if jaw 91 were raised, it is evident that it must be in clamping position for the purpose of holding the film firmly. In order that the cutter shall not function until the jaw 91 is properly positioned, the following safety device has been provided.

Positioned underneath the raised portion 20 of the table is a circuit closer 179 that is normally held open by a spring. This circuit closer is connected in the circuit 180 that conducts current to motor 140. Since the circuit closer is normally open, like an ordinary push button, it is evident that this motor can not be started by closing switch 80 alone. For the purpose of closing the circuit closer when jaw 91 reaches operative or film clamping position, a pin 181 is slidably mounted in an opening in the top 20a. The lower end of this pin rests on the movable member of the circuit closer and is of such length that when the parts are positioned as shown in Fig. 5 the circuit closer will be closed but if jaw 91 is raised a short distance the circuit closer will be open.

It is also quite evident that jaws 102 and 108 would be in the path of the cutter and associated parts if they were left in the position shown in Fig. 6, and it is therefore necessary to provide a latch that makes it impossible to start the cutter moving until jaw 102 has been raised to the position shown in Fig. 5. Attention has already been directed to the latching lever 173 with its plunger 174 and to the cross bar 112. If we refer to Fig. 5 we will see that when jaws 102 and 108 are in vertical position the cross bar 112 has engaged the head 175 and pushed plunger 174 downwardly whereby the end of lever 173, which is normally positioned in the path of plunger 169, is raised so that it permits this plunger to be pushed inwardly to release the clutch arm 157 to make the clutch function. When jaw 91 and jaws 102 and 108 are in the position shown in Fig. 5, motor 140 is running and is turning clutch member 150, and lever 173 is held in inoperative position.

If plunger 169 is now pushed inwardly a sufficient distance to rotate the bell crank 164a, sufficiently to release arm 157 and then released, the clutch will become operative and rotate disk 138 one revolution. The bell crank pivoted at 135 will make a complete oscillation thereby moving the slide 118 forward and back. The cutter is meanwhile rotated by the action of the belt 178 whose tension remains the same during the cycle, due to the fact that it passes around pulleys 133 which move with slide 118. The top portion 20a has an opening 182 under which is positioned a drawer 183. The ends of the films trimmed drop through this opening and into the drawer.

*Operation*

Having thus described the mechanism, the operation will now be described.

After each exhibition the film must be rewound onto another reel so as to get the beginning of the picture to the outside of the reel. During the rewind operation the film is also examined for tears and breaks. When a film is to be rewound, with the apparatus described above, the reel is inserted in the housing to the left in Fig. 1 and the end is passed out of the housing, across the machine and into the housing to the right where it is attached to an empty reel. The doors of the housing are now closed and motor 35 started by closing switch 80. The operator is seated on a stool in front of the machine with his feet resting on pedals 72L and 72R. To start the winding, his right foot exerts a pressure on pedal 72R and his left foot resists the upward movement of pedal 72L. After spring 73 has been tensioned the operator permits pedal 72L to rise thereby allowing disk 641 to turn clockwise (Fig. 1) and move friction pinion 48 into engagement with disk 29, whereupon shaft 45 will turn and rotate the reel.

The speed of rotation can be adjusted by means of the plunger 61 which moves the friction pinion towards and away from the center of disk 29. As the film is being transferred from one reel to the other the operator lets it run between his fingers and if a break or tear is present he stops the rewind reel by the simple action of pressing down on pedal 72L until the friction pinion is moved out of engagement with disk 29. It is found that brakes are unnecessary with the present machine because the friction of the bearings and the fact that the driven reel is completely disconnected from the motor precludes the reels from rotating to any appreciable extent, due to their momentum. If the film must be returned a short distance to get the damaged place into proper position for splicing, this can be readily effected by exerting such pressure on pedal 72L that friction pinion 43 will have its tire 44 brought into contact with disk 28.

If a film is to be rewound without inspection the supply reel is positioned in the housing to the right and its end attached to an empty reel in the housing to the left after which pedal 72L is moved downwardly until pin 65 passes dead center, whereupon the parts latch in operative position and the rewinding takes place without further action on the part of the operator.

When a tear or break is found that requires the film to be cut and spliced, the pedals are manipulated until the film is stopped and if necessary the winding is reversed to bring the torn place back over the splicer. The film is now separated at the tear. The end of the film, attached to the reel at the left, is now manipulated so as to insert the front edge between arms 98 and 99 after which the positioning pins 90 are inserted in sprocket openings near the end. Jaw 91 is now pressed into place against the upper surface of the film. When jaw 91 is pressed down it moves pin 181 downwardly and closes the circuit to motor 140, as above explained. The other end of the film is now clamped between jaws 102 and 108 in the manner shown in Figs. 5 and 6. If the jaws are in the position shown in Fig. 6 it is evident that the ends of the film will be sheared by the action of shear plates 96, 109 and 88, 106 if jaws 102 and 108 are moved downwardly, and the parts will appear as in Fig. 7. Before the splice can be made the emulsion must be removed from the upper surface of the film that is held by jaw 91 and this can be done either before or after the ends of the film are trimmed.

We will now assume that the parts are in the position shown in Fig. 6 and that motor 140 is operating thereby turning the cutter 114 and the clutch member 150. Before the clutch can be made operative for the purpose of reciprocating the cleaner, latch lever 173 must be raised to unlatching position and this is accomplished by rotating the clamping jaws 102 and 108 to vertical position, as shown in Fig. 5. In this position bar 112 engages head 175 and holds the parts in such position that plunger 169 can be pushed inwardly so as to release lever 157. The operator now gives plunger 169 an inward shove, whereupon the clutch becomes effective and rotates disk 138 one complete revolution, thereby reciprocating slide 118 and the cleaner, as above explained. Film cement is now applied to the cleaned surface and jaws 102 and 108 rotated forwardly and downwardly thereby shearing the film ends and bringing the upper film down onto the surface containing the cement. The parts are now in the position shown in Fig. 7 in which position they are held until the cement has set, after which jaws 91 and 108 are raised and the film released. The rewinding operation can now be resumed.

The upper surface of support 84 and of shear plate 88 is fixed relative to the base and the path of the cutter so that after the depth of cut has been adjusted by screws 124 and 125 there will be no accidental change in this and for this reason support 84 is either made integral with base 82 or secured rigidly thereto by screws.

Attention is directed to the fact that the clamping jaws are fixed to the base by a pivotal connection only and that the film therefore has no transverse movement relative to the base. The cleaner, on the other hand, is slidably connected with the base and moves transversely of the film. The safety devices, which assure that the cleaner will not move as long as any of the parts occupy a position where they interfere with the movement of the cutter or while the jaw 91 is out of engagement with the film, are important as they prevent injury to the film and to the machine.

Attention is also directed to the fact that the splicer and the rewind apparatus are driven by separate motors as this makes the two machines independent and makes it possible to retain the circuit to the splicer motor open until the parts are in proper position for safe operation.

In the drawings a specific construction has been shown which has been described herein but it is evident that specifically different constructions can be employed for some of the elements without change in function or mode of operation and applicant considers that such mechanical equivalents are included in his invention.

Having described the invention what is claimed as new is:

1. A film splicing device, comprising in combination, a base, means comprising a jaw movably attached to the base for clamping a film and holding it stationary relative thereto, means for cleaning the upper surface of the clamped film comprising a rotary cleaner slidably connected with the base, means comprising a pivoted crank and a connecting rod for reciprocating the cleaner across the film, means for positioning another film section over the cleaned surface, said last named means comprising a pair of clamping jaws movable about a pivot perpendicular to the line of movement of the cleaner, a latch mechanism for holding the cleaner reciprocating means inoperative, and means operated by the movement of the pair of jaw members about their pivot for releasing said latch when they are in one position.

2. A film splicing device, comprising in combination, a base, means comprising a jaw movably attached to the base for clamping a film and holding it stationary relative thereto, means for cleaning the upper surface of the film, comprising a rotary cleaner slidably connected with the base for reciprocal movement across the film, means for reciprocating the cleaner comprising a motor, a power circuit for the same, a normally open circuit closer in the circuit, means operated by the movement of the clamping jaw towards operative position for closing the circuit to the motor, and means for positioning the end of another film section over the cleaned surface.

3. A film splicing device, comprising in combination, a base, a projection extending upwardly therefrom and provided at its top with a film supporting surface, means for positioning and clamping one end of a film in position on said surface comprising a clamp jaw pivotally attached to the base, means for holding the jaw in clamping position, means for holding and positioning one end of another film section, comprising a pair of cooperating superposed jaws having means for positioning a film therebetween, means for holding the pair of jaws in operative relation, the two jaws forming the pair being movable about a common pivot as a unit or independently, stops for limiting the pivotal movement of the lower jaw of the pair in both directions, means for cleaning the upper surface of the film held by the first clamp jaw, said means comprising a rotary cleaner sildably connected with the base for movement across the upper surface of the film, means for reciprocating the cleaner, a latch mechanism for holding the cleaner reciprocating means inoperative, and means operated by the movement of the pair of jaw members about their pivot for releasing said latch when they are in one position.

4. A film splicing device, comprising in combination, a base, a projection extending upwardly therefrom and provided at its top with a film supporting surface having a transverse film supporting ledge, means for positioning and clamping a film in position on said surface comprising a clamp jaw pivotally attached to the base, means for holding and positioning one end of another film section comprising a pair of cooperating superposed jaws having means for positioning a film therebetween, means for holding the pair of jaws in operative relation, the two jaws forming the pair being movable about a common pivot as a unit or independently, stops for limiting the pivotal movement of the lower jaw of the pair in both directions, means for cleaning the upper surface of the film held by the first clamp jaw, said means comprising a rotary cleaner slidably connected with the base for movement across the upper surface of the film, means for reciprocating the cleaner comprising an electric motor, a power circuit to the motor, a normally open circuit closer in said circuit, and means operated by the first mentioned clamping jaw for closing the circuit when the clamping jaw is in film engaging position with respect to the supporting surface of the projection.

5. A film splicing device, comprising in combination, a base, a projection extending upwardly therefrom and provided at its top with a film supporting surface, means for positioning and clamping a film in position on said surface comprising a clamp jaw pivotally attached to the base, means for holding the clamp jaw in operative position relative to the supporting surface, means for holding and positioning one end of another film section comprising a pair of cooperating superposed jaws having means for positioning a film therebetween, means for holding the pair of jaws in operative relation, the two jaws being movable about a common pivot as a unit or independently, stops for limiting the pivoted movement of the lower jaw of the pair in both directions, means for cleaning the upper surface of the film held by the first clamp jaw, said means comprising a rotary cleaner slidably connected with the base for movement across the upper surface of the film, means for reciprocating the cleaner comprising an electric motor, a power circuit to the motor, a normally open cricuit closer in said circuit, means comprising the first mentioned clamp jaw for closing the circuit closer when the clamp jaw is in film engaging position, a latch for holding the cleaner reciproca..ing means in inoperative position, and means operated by the movement of the pair of clamping jaws for releasing the latch when the pair of jaws is in one limiting position.

6. In a film splicing device, means for cleaning a surface on the emulsion side for the reception of cement, comprising in combination, a base, an upwardly extending projection whose upper surface forms a support for a film, means for positioning a film in a predetermined relation to the surface, means comprising a jaw pivoted to the base and movable into position to clamp the film against the supporting surface, the supporting surface projecting beyond the corresponding edge of the jaw, an elongated guide lug projecting upwardly from the base, a slide movable along said guide in a direction at right angles to the film, a rotary cleaner attached to the slide in position to travel across the film over that part exposed above the supporting surface, means comprising an electric motor for moving the cleaner over the film and back again, means comprising a normally open switch for controlling the operation of the motor, and means responsive to the movement of the pivoted jaw for closing the switch when the jaw is in film holding position.

7. In a film splicing device, means for cleaning a surface on the emulsion side for the reception of cement, comprising in combination, a base, an upwardly extending projection whose upper surface forms a support for a film, means for positioning a film in a predetermined relation to the surface, means comprising a jaw pivoted to the base and movable into position to hold the film, the supporting surface projecting beyond the corresponding edge of the jaw, an elongated guide lug projecting upwardly from the base, a slide movable along said guide in a direction at right angles to the film, a rotary cleaner attached to the slide in position to travel across the film over that part exposed above the supporting surface, means for adjusting the vertical distance from the cleaner to the supporting surface, means comprising a motor for reciprocating the cleaner over the film, a normally open circuit closer in series with the motor, and means operated by the movement of the jaw to film clamping position for closing the circuit closer.

8. In a film splicing device, means for cleaning a surface on the emulsion side for the reception of cement, comprising in combination, a base, an upwardly extending projection whose upper surface forms a support for a film, means for positioning a film in a predetermined relation to the surface, means comprising a jaw pivoted to the base and movable into position to hold the film, the supporting surface projecting beyond the corresponding edge of the jaw, an elongated guide lug projecting upwardly from the base, a slide movable along said guide in a direction at right angles to the film, a rotary cleaner attached to the slide in position to travel across the film over that part exposed above the supporting surface, means for adjusting the position of the cleaner vertically with respect to the film supporting surface, means comprising an electric motor for moving the cleaner over the film and back again, means comprising a normally open switch connected in series with the motor for controlling its operation, and means operated by the film holding jaw for closing the switch when the jaw is in operative position.

9. In a film splicing device, means for cleaning a surface on the emulsion side for the reception of cement, comprising in combination, a base, an upwardly extending projection whose upper surface forms a support for a film, means for positioning a film in a predetermined relation to the surface, means comprising a jaw pivoted to the base and movable into position to hold the film, the supporting surface projecting beyond the corresponding edge of the jaw, an elongated guide lug projecting upwardly from the base, a slide movable along said guide in a direction at right angles to the film, a rotary cleaner attached to the slide in position to travel across the film over that part exposed above the supporting surface, means for rotating the cleaner, means for adjusting the position of the cleaner vertically with respect to the film supporting surface, means comprising an electric motor for moving the cleaner over the film and back again while it is rotating, means comprising a normally open switch in the motor circuit for controlling the operation of the motor, and means operated by the movement of the film holding jaw to operative position for closing the switch when the jaw has reached operative position.

10. In a film splicing device, means for cleaning a surface on the emulsion side for the reception of cement, comprising in combination, a base, an upwardly extending projection whose upper surface forms a support for a film, means for positioning a film in a predetermined relation to the surface, means comprising a jaw pivoted to the base and movable into position to hold the film, the supporting surface projecting beyond the corresponding edge of the jaw, an elongated guide lug projecting upwardly from the base, a slide movable along said guide in a direction at right angles to the film, a rotary cleaner attached to the slide in position to travel across the film over that part exposed above the supporting surface, means for adjusting the position of the cleaner vertically with respect to the film supporting surface, means comprising an electric motor for moving the cleaner over the film and back again, means comprising a normally open switch in the motor circuit for controlling the operation of the motor, means operated by the movement of the film holding jaw to operative position for closing the switch when the jaw has reached operative position, and means for lapping the end of another film section over the cleaned surface and for simultaneously shearing the film, said means comprising a pair of cooperating jaws rotatable about a common axis parallel with the length of the film and cooperating shear plates carried by the film support, the first mentioned jaw and by each of the jaws of the cooperating pair.

11. In a film splicing device, means for cleaning a surface on the emulsion side for the reception of cement, comprising in combination, a base, an upwardly extending projection whose upper surface forms a support for a film, means for positioning a film in a predetermined relation to the surface, means comprising a jaw pivoted to the base and movable into position to hold the film, the supporting surface projecting beyond the corresponding edge of the jaw, an elongated guide lug projecting upwardly from the base, a slide movable along said giude in a direction at right angles to the film, a rotary cleaner attached to the slide in position to travel across the film over that part exposed above the supporting surface, means for adjusting the position of the cleaner vertically with respect to the film supporting surface, means comprising an electric motor for moving the cleaner over the film and back again, means comprising a normally open switch in the motor circuit for controlling the operation of the motor, means operated by the movement of the film holding jaw to operative position for closing the switch when the jaw has reached operative position, means for lapping the end of another film section over the cleaned surface and for simultaneously shearing the film, said means comprising a pair of cooperating jaws rotatable about a common axis parallel with the length of the film and cooperating shear plates carried by the support, the first mentioned jaw and by each jaw of the cooperating pair, means for latching the cleaner reciprocating means in inoperative position, and means operated by an upward and rearward rotation of the pair of cooperating jaws to release said latch when the jaws have reached a predetermined position.

12. A film splicing device, comprising, in combination a base having an upwardly extending projection whose upper surface forms a film support, a clamping jaw mounted on a pivot for movement into and out of film clamping position with said support, a pair of film clamping jaws pivotally mounted on the base for rotation relative to the base and relative to each other, a stop for engaging the lower jaw of the pair to limit downward movement thereof, means for holding the pair of jaws in film clamping position, a film cleaning device movably carried by the base, said device comprising a rotary cleaner, means for reciprocating the rotary cleaner over the film resting on the support, means comprising an electric motor for rotating the cleaner, means comprising a switch for controlling the operation of the motor, and means operated by the movement of the first mentioned jaw into film clamping position for closing the switch.

13. A film splicing device, comprising in combination, a base, a film supporting projection extending upwardly therefrom, a jaw pivotally attached to the base for movement towards and away from said projection for clamping a film and holding it stationary, means for holding the jaw in film clamping position, means for cleaning the upper surface of the film, said means comprising a rotary cleaner slidably connected with the base for reciprocating movement across the film, means for reciprocating and rotating the cleaner, a pivot carried by the base, a pair of cooperating clamping jaws attached to said pivot for movement relative to each other and movable relative to the base from horizontal to vertical position, and means controlled by the movement of the pair of jaws for holding the cleaner inoperative while the pair of jaws are in horizontal position and for releasing the cleaner when they are moved to vertical position

JACOB M. GOLDBERG.